United States Patent [19]
Rees et al.

[11] 4,090,101
[45] May 16, 1978

[54] MANUFACTURE OF ELECTRIC LAMPS

[75] Inventors: John Michael Rees; Christopher Arthur Horler, both of London; Anthony Peter Downing, Runcorn, all of England

[73] Assignees: Thorn Electrical Industries Limited; Imperial Chemical Industries Limited, both of London, England

[21] Appl. No.: 759,705

[22] Filed: Jan. 17, 1977

[51] Int. Cl.$^2$ .............. H01S 61/12
[52] U.S. Cl. .............. 313/223; 313/222
[58] Field of Search .............. 313/223, 222

[56] References Cited

U.S. PATENT DOCUMENTS 3,311,777 3/1967 Schroder .............. 313/223
4,005,324 1/1977 Dolenga et al. .............. 313/222

*Primary Examiner*—Rudolph V. Rolinec
*Assistant Examiner*—Darwin R. Hostetter
*Attorney, Agent, or Firm*—Robert F. O'Connell

[57] ABSTRACT

The invention relates to the manufacture of electric lamps containing fluorine in their gas fill. Fluorine can be accurately and conveniently introduced into an electric lamp envelope in the form of a fluorocarbon polymer. If a soluble fluorocarbon polymer, such as a degraded PTFE, is dissolved in a suitable solvent, for example a fluorine-substituted hydrocarbon or halocarbon solvent, the resulting solution can be metered with great accuracy into the lamp envelope and the solvent subsequently evaporated. The invention avoids the difficulties otherwise inherent in dispensing accurate quantities of an extremely reactive gaseous material.

3 Claims, 1 Drawing Figure

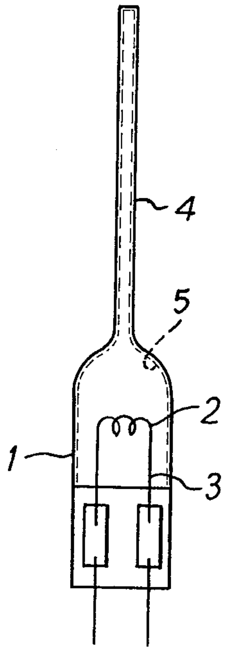
4
5
2
1
3

MANUFACTURE OF ELECTRIC LAMPS

The present invention relates to the manufacture of electric lamps and, more particularly, to a method of introducing fluorine into the lamp envelopes.

In the manufacture of electric lamps having a gas fill containing fluorine, more especially tungsten/flourine incandescent lamps, it is necessary that a predetermined and carefully controlled quantity of fluorine be introduced into the lamp envelope. Halogens are conventionally introduced into lamp envelopes by careful metering of the element as such but this is difficult in the case of fluorine owing to its gaseous state. Moreover, the necessity for accurate control is particularly important in the case of fluorine because of its high reactivity.

It has been proposed to introduce halogen in the form of a normally solid compound of the element, conveniently in solution in a non-polar solvent, for example as a halophosphonitrile in U.S. Pat. No. 3,898,500. Other compounds are mentioned in U.S. Pat. No. 3,902,091. Once again, however, there are problems with fluorine in that it is difficult to find a combination of a fluorine-containing, low vapour pressure solid and a suitable solvent that will facilitate the production of fluorine-containing lamps with a high degree of consistency.

We have now found that superior results can be obtained by the introduction of fluorine into a lamp envelope in the form of a soluble fluorocarbon polymer. It has further been found that particularly suitable solvents for this purpose are fluorinated organic solvents, more especially fluorine-substituted hydrocarbon or halocarbon solvents, such as those known under the Trade Marks FREON and ARCTON.

Accordingly the invention provides a method of manufacturing an electric lamp having a gas fill containing fluorine in which the fluorine is introduced as a fluorocarbon polymer, preferably in solution in a solvent therefor, such as a fluorinated organic solvent. The invention also embraces electric lamps containing fluorocarbon polymers as a source of fluorine for the gas fill.

The preferred fluorocarbon product is a soluble degradation product of polytetrafluoroethylene (PTFE), sold for use as a lubricant under the Trade Mark KRYTOX (DuPont). This substance is preferably dissolved in trichlorotrifluoroethane ($C_2F_3Cl_3$) and the solution can be dispensed into the lamp envelopes by the technique described in U.S. Pat. No. 3,898,500.

The application of the invention enables considerable improvements in control of fluorine dosage to be achieved. For example, by using a gaseous fluoride, such as $SF_6$, $WF_6$ or $NF_3$, variations of ±50% in the fluorine dose can occur, which is quite unacceptable for other than laboratory experiments. In contrast, similar lamps dosed with a solution of fluorocarbon polymer have exhibited a fluorine dose controllable to better than ±5%.

The lamp envelope, which may be of a high silica content glass, for example fused silica of the 96% silica glass sold under the Trade Mark VYCOR (Corning), is preferably provided with a protective fluorine-resistant coating. Preferred coating materials are glassy metal phosphates and arsenates, more especially aluminium and aluminium titanium phosphates, or alumina, and the formation of protective coatings of such materials, by deposition of solutions of compounds of the elements concerned followed by evaporation of the solvent and baking, is described in U.S. Pat. No. 3,902,091 and our copending application Ser. No. 758,872 filed Jan. 17, 1977 respectively.

An example of this invention will now be described with reference to the accompanying drawing, the single FIGURE of which shows a tungsten/fluorine lamp structure:

A 12V 100W lamp, of the type commonly used in film projectors, comprises a "Vycor" envelope 1, in which is sealed a tungsten filament 2 supported on filament tails or lead-in wires 3 and is provided with an exhaust tube 4. The lamp is provided with a fluoride-resistant aluminium phosphate, aluminium titanium phosphate or alumina layer 5 covering the inside surface of the envelope 1, the filament 2 and tails 3, as mentioned above. The lamp is then dosed with 35 μg of the fluorocarbon polymer, as a 0.5 g/l solution in $C_2F_3Cl_3$, the solvent subsequently removed, as described in U.S. Pat. No. 3,898,500 and the lamp gas-filled in the normal manner with 3½ atm. of argon, at room temperature.

Lamps of this type have been run at 13.8 V, which corresponds to a temperature at the centre of the filament just below the melting point of tungsten, fusing of the centre turn occurs at about 14.5 V. Such lamps have achieved lives of 40 hours, without detectable thinning of the hottest spot at the centre of the filament, subsequent failure occurring by tungsten loss in the colder regions of the filament or tails. In comparison, similar lamps containing $Br_2$ instead of $F_2$ fuse at the centre of the filament after 20 hours operation at 13.8 V.

We claim:

1. In an electric lamp having an envelope, an electrically activated light emitting structure within said envelope with conductive leads thereto, and a gas fill including fluorine in said envelope, the improvement which comprises:

a fluorocarbon polymer included within said envelope as a source of said fluorine.

2. An electric lamp according to claim 1 wherein the fluorocarbon polymer is a degradation product of PTFE.

3. An electric lamp according to claim 1 wherein said envelope has an internal surface coated with a protective glassy coating selected from metal phosphates and alumina.

* * * * *